United States Patent [19]

Macke

[11] Patent Number: 5,511,574
[45] Date of Patent: Apr. 30, 1996

[54] THRUST BLOCK AND COUPLING FOR AN IRRIGATION SYSTEM

[76] Inventor: Robert Macke, 6208 Charity Dr., Cincinnati, Ohio 45248

[21] Appl. No.: 340,192

[22] Filed: Nov. 15, 1994

[51] Int. Cl.⁶ ............................. F16L 55/18; B05B 15/06
[52] U.S. Cl. ................. 137/15; 137/363; 138/106; 239/201; 239/276
[58] Field of Search .................... 285/345, 61; 138/106; 239/200, 201, 276; 137/363, 15

[56] References Cited

U.S. PATENT DOCUMENTS

| | | | |
|---|---|---|---|
| 152,825 | 7/1874 | Brown | 239/201 |
| 943,747 | 12/1909 | Hickman . | |
| 1,053,528 | 2/1913 | Mern . | |
| 1,613,887 | 1/1927 | Gunn . | |
| 1,632,206 | 6/1927 | Tolman, Jr. | 138/106 |
| 1,832,351 | 11/1931 | Beaver . | |
| 1,956,683 | 5/1934 | Hewitt . | |
| 2,002,103 | 5/1935 | Wheeler | 138/106 |
| 2,416,787 | 3/1947 | White . | |
| 2,751,250 | 6/1956 | Block | 239/201 |
| 3,315,971 | 4/1967 | Sakurada | 285/345 |
| 3,323,542 | 6/1967 | Magos et al. . | |
| 3,730,213 | 5/1973 | Bates . | |
| 3,929,288 | 12/1975 | Brusadin et al. | 239/276 |
| 4,329,826 | 5/1982 | Flogaus et al. . | |
| 4,437,486 | 3/1984 | Bianchi . | |
| 4,610,471 | 9/1986 | Halen et al. . | |
| 4,919,391 | 4/1990 | Kemp . | |

OTHER PUBLICATIONS

Wolf Creek Irrigation Catalog, pp. 20, 29–36, 51, Cleveland TN, 1993.

*Primary Examiner*—A. Michael Chambers
*Attorney, Agent, or Firm*—Wood, Herron & Evans

[57] ABSTRACT

A thrust block for an irrigation system enables a high pressure valve or other component connected to the thrust block to be easily replaced without digging out a concrete block and surrounding portion of the ground and sectioning the adjacent pipe sections. The valve includes flanges on each end thereof which are releasably secured to similarly configured flanges on couplings. Braces are partially embedded within a concrete block beneath the valve and an upper end of each brace is secured to the fasteners joining the conventional flanges of the valve and the coupling. A push-on fitting is provided on each coupling for easy assembly of the coupling to the adjacent pipe sections.

16 Claims, 3 Drawing Sheets

THRUST BLOCK AND COUPLING FOR AN IRRIGATION SYSTEM

BACKGROUND OF THE INVENTION

This invention relates to irrigation systems and more particularly to an improved thrust block and coupling for use in irrigation systems.

It is well known to irrigate fields or to water golf courses or the like by means of a water distribution system which extends either underground throughout the course or over the field. The system typically includes PVC piping which extends throughout the field or the course and which is periodically interrupted by high pressure or high flow rate, low pressure valves. These valves are attached to the PVC pipe which is generally anywhere from 2½ to 18 inches in diameter. Conventionally, the PVC pipe slides into a tight gasket of the valve to make a sealed gasketed connection. Specifically, a tapered end on the PVC pipe is forced into a tapered gasket or seal contained within the valve.

After the valve is attached to the PVC pipe, it is conventional to concrete the valve into a fixed underground location anywhere from 18 to 24 inches below ground level so as to prevent the valve from moving when water pressure is applied to the valve, as for example, when the valve is opened and closed. This concreting of the valve is referred to as "thrust" protection or a "thrust block" of the valve. In the absence of such thrust protection, each time the valve is opened or closed, there would be pressure acting upon the valve to try to move it in the ground and eventually become disconnected from the PVC pipe.

One problem with thrust protection as currently practiced in irrigation systems is that the valves are relatively inexpensive and regularly fail for a number of reasons, as for example, the packing inside of the valve fails and begins to leak, or the handle of the valve is twisted off or broken by an overly-enthusiastic technician. Currently, when the valve fails, a backhoe is typically brought in to dig a rather large hole to expose the concrete and the valve embedded therein. Once the backhoe has dug the large hole, the PVC pipe connected to the concreted-in valve is cut and the valve with the concrete is lifted from the hole. A new valve is then attached and extensions added to the existing PVC pipe to accommodate the new valve. More concrete is then poured into the hole around the valve for thrust protection of the new valve, the hole is filled back in and the surrounding ground repaired.

The current method of repairing broken valves having thrust protection within irrigation systems is very time consuming, damaging to the golf course or field, and demanding in that it requires a backhoe for digging out the concreted-in valve. Furthermore, the adjacent PVC pipe sections must be cut or severed in order to facilitate the repair of the valve and pipe extensions installed with the replacement valve further adding to the time, cost and expense of replacing a relatively inexpensive valve or part.

SUMMARY OF THE INVENTION

It has been a primary objective of this invention to provide an improved thrust block for irrigation systems.

A further objective has been to provide such a thrust block which does not require the digging out and removal of the concrete used as an anchor for the thrust block in order to replace a failed valve or other component.

A still further objective of the invention is to provide an improved coupling for valves or other parts of the field irrigation system which can be easily attached, detached, and re-attached.

These and other objectives of the invention have been obtained by a novel coupling for connecting a valve to a pipe in the irrigation system. A conventional flanged valve can be used with the coupling according to this invention. The coupling connects the flanged valve to the adjacent PVC pipes. Advantageously, the coupling is releasably attached to flanged valve and then reattached to a replacement valve or part. The valve is simply connected by flanges to the adjacent couplings and can be easily removed by releasing mechanical fasteners connecting the flanges on the valve to flanges on the coupling.

As opposed to embedding the entire valve in concrete for thrust protection, a pair of braces or common angle irons are attached to the bottom of the valve at the joined flanges. A lower portion of the braces are then embedded into the ground or a block of concrete beneath the valve. As such, the braces are secured relative to the ground and thereby, indirectly, provide thrust protection for the valve against movement when the valve is opened or closed. Preferably, no portion of the valve is contacted by the concrete and when it becomes necessary to change a valve because of a leak or other reason, all that is required is to disconnect the angle iron braces from the flanges of the valve and the flanges of the couplings. The valve is then lifted from the hole and a replacement valve is inserted. The new flanged valve is then attached to the flanges of the couplings on the PVC pipe and the angle iron braces are resecured to the flanges on the valve. As a result, the valve has been replaced and the irrigation system repaired without the golf course or field being damaged by a backhoe digging up a large section of the field and the concrete valve embedded therein.

In another embodiment, the coupling on the upstream side connecting the flanged valve to the PVC pipe includes multiple external lugs each having a threaded hole therethrough. A threaded stud or brace is then inserted through each threaded lug and the studs or braces are concreted into a hole located beneath the valve and the coupling. The thrust blocking of the upstream coupling protects the valve against excessive thrust forces applied to the valve flange, In certain high pressure applications, valve manufacturers take the position that directly thrust blocking the valve destroys or jeopardizes the manufacturing warranty of the valve. Therefore, as a result of blocking the coupling instead of the valve directly, the warranty problems associated with the valve are avoided while thrust protection is still provided to the valve.

The coupling of the invention includes a push-on fitting on one end thereof into which the PVC pipe can be easily inserted and releasably secured for removal and re-insertion as needed. The other end of the coupling includes a conventional flange for mating with the flanged valve in a presently preferred embodiment. The fitting includes an enlarged collar which terminates at an inturned lip. Seated within a groove in the collar is an annular rubber gasket. The gasket is retained in the collar by the inturned lip. The inner diameter of the collar and of the lip are greater than the outer diameter of the PVC pipe to be connected thereto. The PVC pipe is axially inserted into the collar to join the PVC pipe to the coupling and the gasket frictionally retains the PVC pipe to the fitting. As a result, a coupling can include the push-on fitting according to this invention on a first end and have a conventional flange on a second end or other means for attaching to the adjacent valve or other component of the field irrigation system.

In another embodiment of the invention, a coupling having a push-on fitting on a first end and a flange on a second end can be used for connecting to a Tee joint or joint of another configuration. The push-on fitting connects to the adjacent pipe section. The Tee joint or similar joint also has a conventional flange for mating with the flange fitting on the second end of the coupling so that the flange connection can be easily disconnected for replacement of the Tee joint as required.

BRIEF DESCRIPTION OF THE DRAWINGS

The objectives and features of the invention will become more readily apparent from the following detailed description taken in conjunction with the accompanying drawings in which.

DETAILED DESCRIPTION OF THE INVENTION

Figure 1:
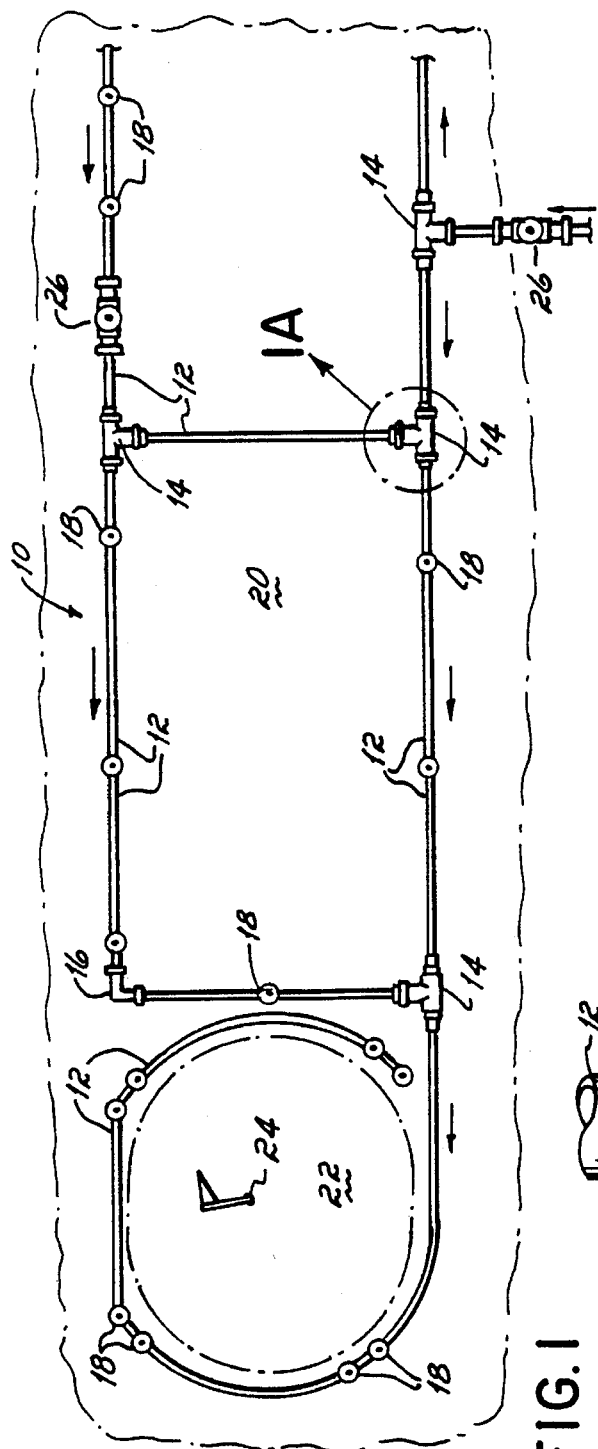
FIG. 1 is a top plan schematic view of a portion of an irrigation system for a golf course according to this invention.
Figure 1B:
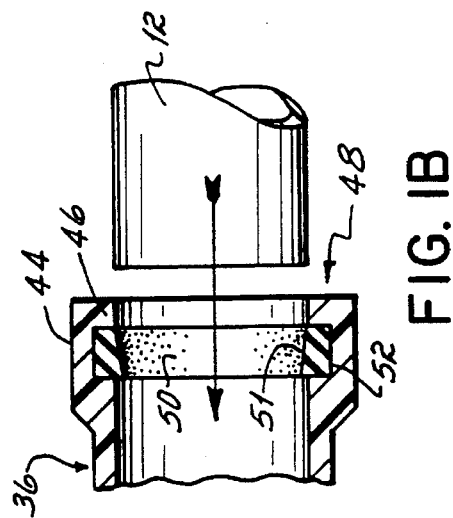
FIG. 1B is an exploded partially cross sectioned view of a push-on fitting on the coupling of FIG. 1A.

Referring to FIG. 1, a portion of an underground irrigation system 10 for a golf course is shown. It will be appreciated by one of ordinary skill in the art that although the invention is shown in the figures and described herein with respect to an underground irrigation system for a golf course, it is readily applicable to other types of irrigation systems. The irrigation system 10 includes an array of interconnected PVC pipes 12 which are connected at specific locations by Tee 14 and Ell 16 joints. Sprinkler heads 18 are adequately positioned along opposing side edges of a fairway region 20 of the golf course and around a green 22 and hole 24 of the golf course. High pressure valves 26 are positioned upstream of specific Tee joints 14 in the system 10 in order to maintain adequate water flow throughout the system 10.

Figure 1A:
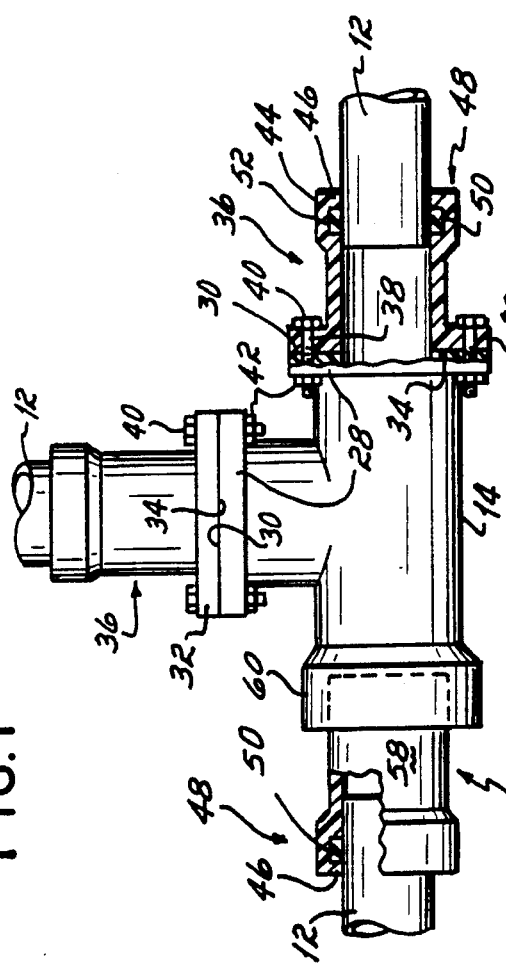
FIG. 1A is an enlarged view of encircled area 1A of FIG. 1 having a Tee section joined to couplings according to this invention.

As shown in FIG. 1A, the Tee joint 14 is at the intersection of three PVC pipes 12. At a first end of the Tee joint 14 according to this invention is an enlarged generally circular flange 28 having a flat face 30 for mating with a similarly configured flange 32 having a mating face 34 on a presently preferred embodiment of a coupling 36 according to this invention. The respective flange faces 30, 34 are juxtapositioned to each other such that holes 38 through each flange 28, 32 are aligned with mechanical fasteners, bolts or the like to releasably join them together. A bolt 40 is threadably engaged by a nut 42 as shown in FIG. 1A to secure the flanges 28, 32 together.

A second end of the first embodiment of the coupling 36 includes an enlarged annular collar 44 which terminates at an inturned lip 46 to form a push-on fitting 48 on the coupling 36. Seated within the annular collar 36 is an annular gasket 50 or ring preferably made of rubber or similar material to form a seal between the coupling 36 and the pipe 12 inserted therein. The gasket 50 preferably is tapered on an inner surface 51 thereof such that an edge of the gasket 50 adjacent to the lip 46 has a larger diameter than the opposing inner edge of the gasket which is spaced from the lip 46.

The gasket 50 is seated and retained within a groove 52 formed by the collar 44 and the lip 46. The inner diameter of the collar 44 and of the lip 46 are greater than the outer diameter of the pipe 12 inserted therein. The pipe 12 is secured to the coupling 36 by a frictional fit between the gasket 50 and the outer surface of the pipe 12 thereby providing a substantially leakless seal. The tapered inner surface 51 of the gasket 50 provides for the substantially leakless seal between the coupling 36 and the pipe 12. A similarly configured coupling 36 is connected to a second flange 28 on the Tee joint 14 as shown in FIG. 1A.

It will be appreciated that other embodiments of the coupling according to this invention are possible within the scope of this invention. For example, another presently preferred embodiment of a coupling 56 is also connected to the Tee joint 14 in FIG. 1A. The coupling 56 includes the push-on fitting 48 as previously described with reference to the first embodiment of the coupling 36. However, a second end of the coupling 56 terminates at an annular sleeve 58 which can be solvent welded, glued or otherwise conventionally joined to an enlarged collar 60 on the Tee joint 14 as is well known in the art.

Figure 2:
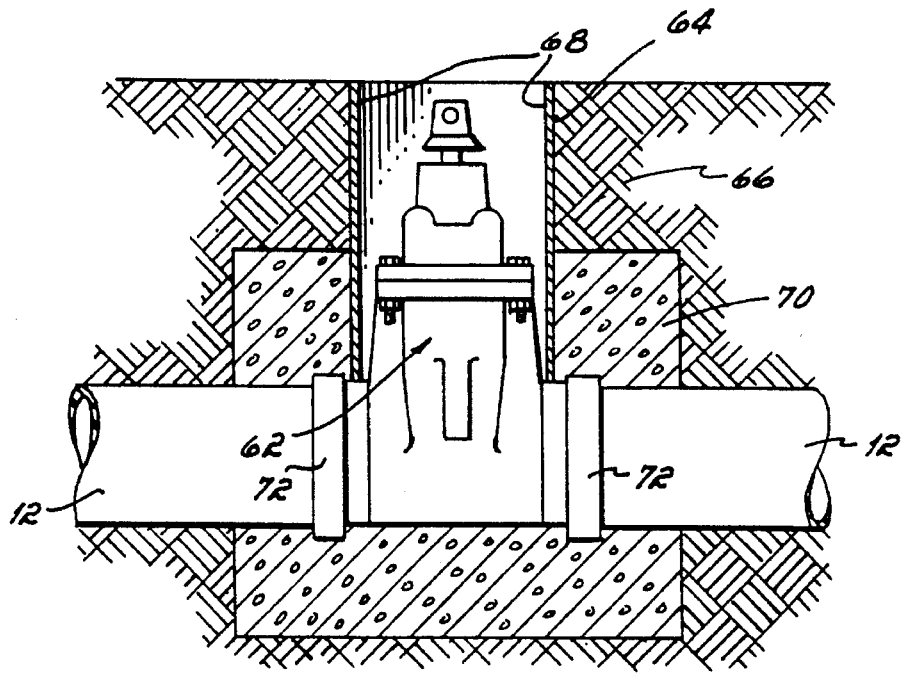
FIG. 2 is a view of a prior art thrust block showing the valve embedded in concrete.

A prior art valve 62 provided with thrust protection is shown in FIG. 2. The valve 62 is positioned between adjacent pipe sections 12 of the system and projects upwardly within a hole 64 in the ground 66 and in between sidewalls 68 within the hole 64 to keep the dirt from caving and falling into the hole 64 and onto the valve 62. The valve 62, adjacent portions of each pipe 12, and portions of the sidewalls 68 are all embedded in a concrete block 70 in order to provide for the thrust protection to prevent the valve 62 from moving and ultimately becoming dislodged from the adjacent pipes 12 when water pressure is applied to the valve 62, as for example, when the valve 62 is opened and/or closed. An enlarged collar 72 on each end of the valve 62 is solvent welded to the adjacent pipes 12 in the prior art device of FIG. 2. As previously described, a problem occurs with prior art valves 62 as shown in FIG. 2 because the valves 62 are relatively inexpensive and regularly fail for any number of reasons, as for example, the packing inside the valve 62 failing and beginning to leak or a handle on the valve 62 being twisted off by an overly-enthusiastic golf course employee or the like. When the prior art valve 62 fails, a backhoe (not shown) must be brought in to dig out a large area around the valve 62. The adjacent sections of PVC pipe 12 must be cut off on each side of the valve 62 and the valve 62 with the concrete block 70 and several portions of the PVC pipe 12 lifted from the enlarged hole. A replacement valve must then be attached and an extension added to each side of the PVC pipe to accommodate the new valve and concrete must be poured into the hole around the new valve for subsequent thrust protection. The dirt removed by the backhoe is then replaced and the grass re-seeded in this portion of the golf course.

Figure 3:
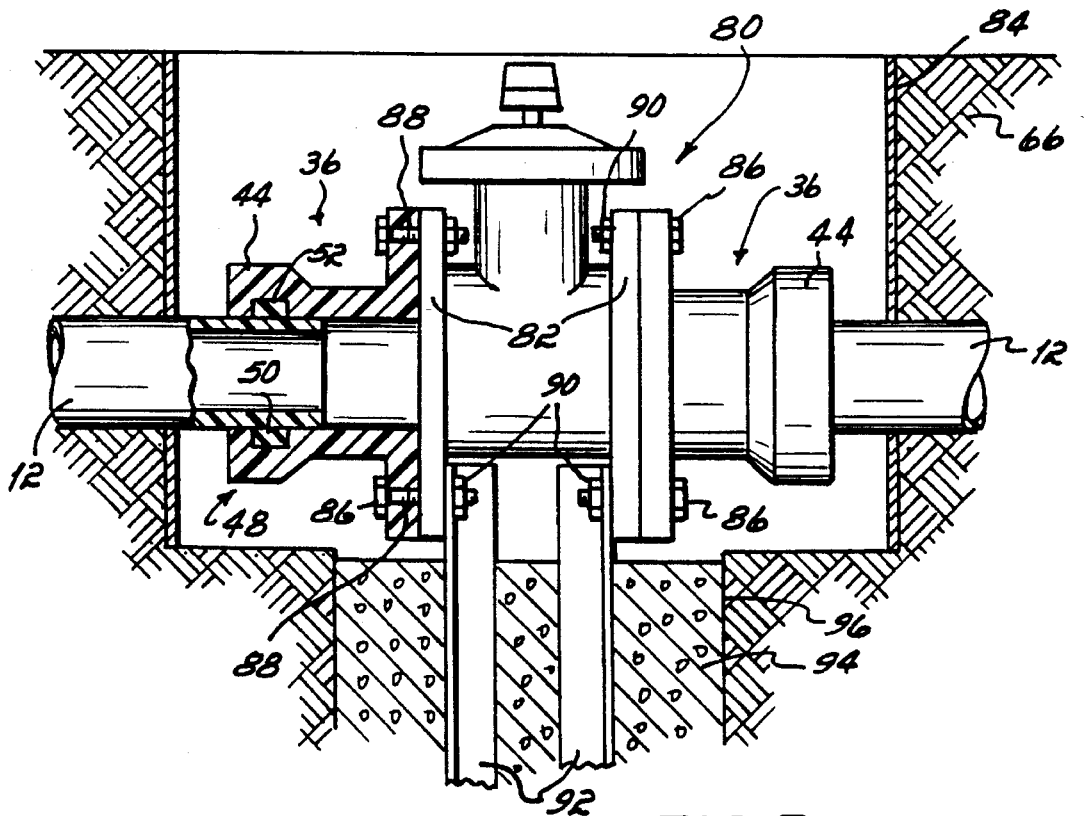
FIG. 3 is a side view of a flanged valve secured to braces embedded in concrete for thrust protection according to this invention.

A presently preferred embodiment of a valve 80 having thrust protection according to this invention is shown in FIG. 3. The valve 80 includes conventional flanges 82 on each end thereof and is located within a hole 84 in the ground 66 in the golf course. The flanges 82 are releasably connected to adjacent couplings 36 or 56 as previously described with reference to FIG. 1A and the push-on fitting 48 of the couplings 36 or 56 are secured to the adjacent PVC pipes 12. The flanges 82 on each end of the valve 80 are connected by bolts 86 through holes 88 in the mating flange faces on the valve 80 and on the couplings 36 or 56 and nuts 90 threadably engaged therewith according to a presently preferred embodiment of the invention. A thrust block or thrust protection is provided to the valve 80 by a pair of braces or angle irons 92 attached to the bottom of each flange 82 on the valve 80. An upper end of each brace 92 is secured to the valve flange 82 and is captured by the nut 90 secured on the bolt 86 connecting the adjacent flanges. A lower portion of each brace is embedded into a concrete block 94 located beneath the valve 80 in a bottom portion 96 of the hole 84. Preferably, no portion of the valve 80 is contacted by the concrete block 94.

As a result of the valve 80 and thrust block of this invention, when it becomes necessary to change the valve 80 due to failure or breakage, all that is required is to disconnect the nuts 90 and bolts 86 joining the braces 92, valve flanges 82 and coupling flanges 32. The old valve is then lifted from the hole 96 and a replacement, similarly configured valve is inserted between the coupling flanges 32 and secured with the bolts 86 and nuts 90 as shown in FIG. 3. The braces 92 remain embedded within the concrete block 94 and the concrete block 94 remains within the ground 66 so that the replacement of the valve according to this invention can be accomplished without a backhoe digging up the concrete block 94 and a large section of the golf course surrounding it. Furthermore, the adjacent sections of PVC pipe 12 do not have to be cut nor extensions added to the PVC pipe 12 to accommodate the new valve.

Figure 4:
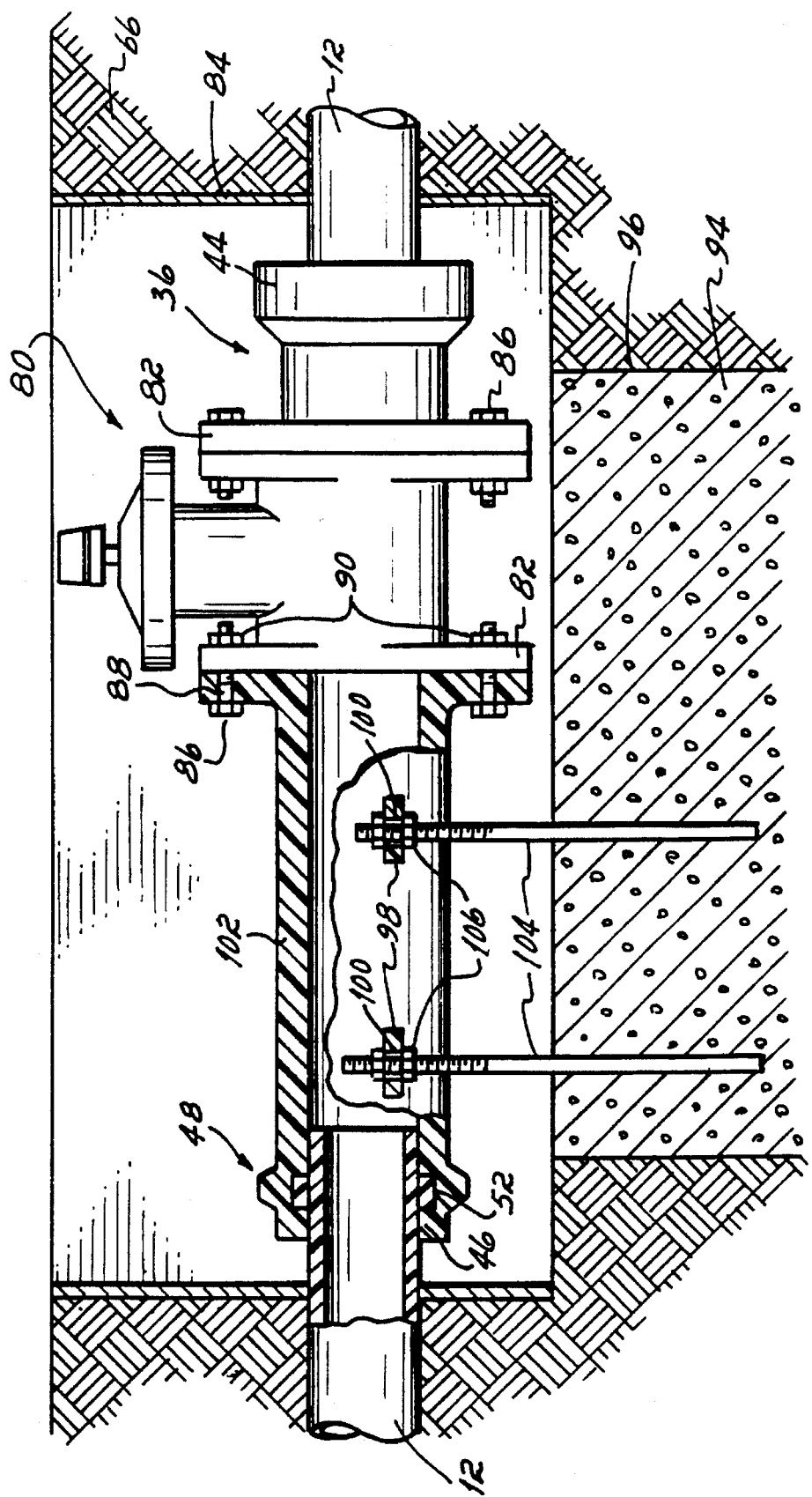
FIG. 4 is another embodiment of the thrust block of this invention with the coupling attached to the braces which are embedded in the concrete.

Another presently preferred embodiment of the valve 80 and thrust block according to this invention is shown in FIG. 4. To protect the valve flanges 82 against pressure surges and thrust, a pair of lugs 98 each having a threaded hole 100 therethrough, are provided on an external surface of a coupling 102 on an upstream side of the valve 80. The valve 80 and downstream coupling 36 or 56 secured thereto are the same as those which are shown and described with reference to the first embodiment of the thrust block according to this invention. A threaded stud or brace 104 is inserted through the hole 100 in each lug 98 and is further secured to the coupling 102 by an upper and a lower nut 106 threadably engaged on the brace 104. A lower portion of each brace 104 is embedded into the concrete block 94 positioned below the valve 80 and upstream coupling 102 as shown in FIG. 4. The upstream coupling 102 has a conventional flange 32 on a first end for mating with the flange 82 on the valve 80 and the push-on fitting 48 on a second end for securing to the upstream pipe 12 according to the present invention.

Providing the thrust block and securing the braces 104 to the upstream coupling 102 rather than directly to the valve flanges 82 protects the valve 80 against excessive thrust forces applied to the valve flange 82. This is advantageous because for some high pressure applications, the valve manufacturers take the position that thrust blocking of the valve flange directly destroys the manufacturing warranty on the valve. As a result, the thrust block as shown in FIG. 4 with the braces secured directly to the coupling eliminates the warranty problems while still providing thrust protection and enabling the valve to be easily replaced according to this invention.

It will be appreciated by one of ordinary skill in the art that the embodiments of a thrust block or for thrust protection have been shown and described herein with reference to the valve 80 but can be readily applicable for thrust block protection of other components within the field irrigation system 10. Furthermore, embodiments of the coupling having the push-on fitting 48 are shown and described herein in connection with valves 80 and Tee joints 14 but can be readily adapted and used for other connections between adjacent components of the field irrigation system according to this invention.

From the above disclosure of the general principles of the present invention and the preceding detailed description of preferred embodiments, those skilled in the art will readily comprehend various modifications to which the present invention is susceptible. Therefore, I desire to be limited only by the scope of the following claims and equivalents thereof.

I claim:

1. A method of blocking the thrust within an irrigation system, said method comprising:

providing a valve having a pair of flanges;

releasably securing each said valve flange to a similarly configured flange on an adjacent component of the system;

releasably securing a brace to one of said valve flanges; and anchoring said brace to the ground, wherein said valve can be disconnected from said adjacent component and replaced with a similar valve without removing said brace and said adjacent component from the ground and disturbing the ground surrounding said valve.

2. The method of claim 1 further comprising:

releasing said brace from said valve flange;

removing said valve from the system by releasing each said valve flange from said flanges on said adjacent components;

installing a replacement valve in place of said valve, said replacement valve also having a pair of flanges;

releasably securing each said replacement flange to said flange on said adjacent component; and releasably securing said brace to one of said replacement valve flanges.

3. The method of claim 1 further comprising:

positioning said brace upstream from said valve to resist movement of said valve in response to fluid flowing through the irrigation system.

4. The method of claim 1 wherein said anchoring of said brace is accomplished by embedding a portion of said brace into a block of concrete which is at least partially buried in the ground.

5. A thrust block for use within an irrigation system, said thrust block comprising:

an underground valve of the irrigation system having at least one flange, said valve flange being releasably coupled to a similarly configured flange on an adjacent fluid carrying part of the irrigation system; and a brace releasably secured to said valve flange, said brace being anchored to the ground to inhibit movement of said valve in response to fluid flowing through the irrigation system, said brace being releasably secured to said valve flange and said valve flange being releasably coupled to said similarly configured flange so that said valve can be removed from the ground and replaced without removing said brace from the ground, disturbing said adjacent part and disturbing the ground surrounding said valve.

6. The thrust block of claim 5 further comprising:

a block of concrete embedded into the ground, said brace being partially embedded into said concrete block.

7. The thrust block of claim 5 wherein said valve is located downstream within the irrigation system from said brace.

8. A thrust block for use within an irrigation system, said thrust block comprising:

a valve of the irrigation system having at least one flange, said flange being releasably coupled to a similarly configured flange on an adjacent fluid carrying part of the irrigation system; and a brace secured to said adjacent part, said brace being anchored to the ground to inhibit movement of said component and said adjacent part in response to fluid flowing through the irrigation system, said valve being releasably secured to said adjacent part by said flanges so that said valve can be removed and replaced without removing said adjacent part and said brace from the ground and disturbing the ground surrounding said valve.

9. The thrust block of claim 8 further comprising:

a block of concrete embedded into the ground, said brace being partially embedded into said concrete block.

10. The thrust block of claim 8 wherein said adjacent part is a coupling.

11. The thrust block of claim 10 wherein said coupling comprises:

a push-on fitting on a first end of the coupling, said push-on fitting having an enlarged diameter collar, said collar terminating at a lip on said push-on fitting; and a gasket seated within said collar, said gasket being retained within said collar by said lip;

said lip and said collar each having an inner diameter greater than an outer diameter of a pipe such that when said pipe is axially inserted into said first end of the coupling, said pipe is secured to said coupling by said gasket.

12. The thrust block of claim 8 wherein said brace is secured to an upstream side of said valve.

13. A thrust block for an irrigation system:

a valve having a pair of flanges, each said flange having holes therein;

a first and a second coupling, each said coupling having a flange similarly configured to said valve flanges;

a plurality of mechanical fasteners inserted through said holes in said valve flanges and said coupling flanges, each said valve flange being releasably coupled to one of said coupling flanges by said mechanical fasteners;

a brace releasably secured to one of said valve flanges by said mechanical fasteners; and a block of concrete embedded into the ground, said brace being partially embedded into said concrete block to inhibit movement of said valve secured thereto in response to fluid flowing through the irrigation system;

said valve being releasably coupled to said first and second coupling so that said valve can be removed and replaced without removing said couplings, removing said brace from the ground, and disturbing the ground around said valve.

14. The thrust block of claim 13 wherein each said coupling comprises:

a push-on fitting on a first end of the coupling, said push-on fitting having an enlarged diameter collar, said collar terminating at a lip on said push-on fitting; and a gasket seated within said collar, said gasket being retained within said collar by said lip;

said lip and said collar each having an inner diameter greater than an outer diameter of a pipe such that when said pipe is axially inserted into said first end of the coupling, said pipe is secured to said coupling by said gasket.

15. A thrust block for an irrigation system:

a valve having a pair of flanges, each said flange having holes therein;

a first and a second coupling, each said coupling having a flange similarly configured to said valve flanges;

a plurality of mechanical fasteners inserted through said holes in said valve flanges and said coupling flanges, each said valve flange being releasably coupled to one of said coupling flanges by said mechanical fasteners;

a brace secured to one of said couplings on an upstream side of said valve; and a block of concrete embedded into the ground, said brace being partially embedded into said concrete block to inhibit movement of said valve and said coupling secured thereto in response to fluid flowing through the irrigation system;

said valve being releasably coupled to said first and second coupling so that said valve can be removed and replaced without removing said couplings removing said brace from the ground and disturbing the ground around said valve.

16. The thrust block of claim 15 wherein each said coupling comprises:

a push-on fitting on a first end of the coupling, said push-on fitting having an enlarged diameter collar, said collar terminating at a lip on said push-on fitting; and a gasket seated within said collar, said gasket being retained within said collar by said lip;

said lip and said collar each having an inner diameter greater than an outer diameter of a pipe such that when said pipe is axially inserted into said first end of the coupling, said pipe is secured to said coupling by said gasket.

* * * * *